United States Patent [19]

Lee

[11] Patent Number: 4,771,593

[45] Date of Patent: Sep. 20, 1988

[54] CONVERTIBLE BLADE HUB

[76] Inventor: Harold D. Lee, 8609 Arborside, Dallas, Tex. 75243

[21] Appl. No.: 53,103

[22] Filed: May 21, 1987

Related U.S. Application Data

[63] Continuation-in-part of Ser. No. 877,478, Jun. 23, 1986, abandoned.

[51] Int. Cl.$^4$ ............................................. A01D 34/73
[52] U.S. Cl. ...................................... 56/295; 56/17.5; 464/33
[58] Field of Search ................. 56/12.7, 17.5, 295, 56/255; 464/32, 33; 403/2

[56] References Cited

U.S. PATENT DOCUMENTS

| | | | |
|---|---|---|---|
| 1,610,414 | 6/1926 | Bernard et al. | 464/33 |
| 1,923,132 | 8/1933 | Witkin | 464/33 |
| 2,889,162 | 6/1959 | Norris | 403/2 |
| 3,049,898 | 8/1962 | Voth | 464/33 |
| 3,355,998 | 12/1967 | Roerisch | 403/2 |
| 3,430,461 | 3/1969 | Boylan | 464/32 |
| 3,601,960 | 8/1971 | Buechler | 56/295 |
| 3,910,017 | 10/1975 | Thorud et al. | 56/295 |
| 4,295,324 | 10/1981 | Frantello | 56/12.7 |
| 4,513,563 | 4/1985 | Roser et al. | 56/12.7 |

Primary Examiner—John Weiss
Attorney, Agent, or Firm—Dennis T. Griggs

[57] ABSTRACT

A blade coupling assembly includes a spindle having a base plate and a collar which fits about the drive shaft of an engine. A pair of locking pins are removably received within pockets formed on opposite sides of a central bolt opening in the base plate. A lawn mower cutting blade is provided with three corresponding openings which are aligned with the central bolt opening and the locking pins, respectively. The cutting blade is secured between the bolt head and base plate, and a spacer ring is compressed between the base plate and the end of the drive shaft. The locking pins have reduced diameter portions which are received within the blade openings, and annular shoulder portions which engage the cutting blade. When locking pins are removed from the base plate pockets, the base plate is converted for attachment to a replacement blade having upturned side flanges instead of locking pin holes. In the converted arrangement, the upturned side flanges lock the cutting blade against the sides of the base plate.

1 Claim, 3 Drawing Sheets

CONVERTIBLE BLADE HUB

CROSS REFERENCE TO RELATED APPLICATION

This is a continuation-in-part of U.S. application Ser. No. 877,478 filed June 23, 1986, abandoned 9/25/87.

FIELD OF THE INVENTION

This invention relates generally to rotary mowers, and in particular to hub coupling devices for attaching a cutting blade to a lawn mower engine.

BACKGROUND OF THE INVENTION

A conventional rotary lawn mower includes a housing mounted on wheels which supports an engine, either internal combustion or electric, and an elongated blade having a cutting edge at each end, mounted for rotation through a horizontal plane. Typically, the engine is mounted onto the chassis, and the blade is coupled directly to the drive shaft of the engine.

In such mowers, the blade is bolted directly onto the drive shaft and can be removed from time-to-time for sharpening and balancing purposes. Moreover, the engine is removable from the chassis for repair and/or replacement. Typically, the blade is matched with the engine according to size, power rating and method of attachment to the drive shaft. The blade must be properly spaced with respect to the underside of the housing, as well as with respect to ground level. That is, the blade is desirably located at a nominal spacing location which will afford adequate clearance with respect to the housing, but which is also properly located for grass-cutting purposes throughout the range of vertical wheel adjustment.

DESCRIPTION OF THE PRIOR ART

Although it is a common practice to attach the cutting blade directly to the drive shaft, the blade is sometimes coupled indirectly to the drive shaft by means of a coupling device such as a spindle. Such spindles may include an integral hub onto which the blade is attached, and one or more shear pins for preventing rotation of the blade relative to the hub. In addition to locking the position of the blade against the hub, the shear pins prevent the transmission of a damaging impulse load to the engine which might occur should the blade impact a fixed or heavy object.

A related function provided by such a spindle assembly is to accurately position the blade with respect to the housing and at a nominal cutting elevation. It will be appreciated that the substitution of a new blade having a different cutting profile, or the substitution of a new engine having a different block size or drive shaft length, will alter the desired blade position relative to the mower housing and/or nominal cutting elevation. This is of particular concern when substituting a more powerful engine or a replacement engine having metric dimensions for an engine having dimensions based upon the U.S. Customary System of unit measurement.

Replacement engines are commonly available which are manufactured according to the International System of unit measurement (metric). One important class of internal combustion engines which are used for replacement purposes is provided with a drive shaft having an axially-extending bore which is sized and threaded to receive and engage the threaded shaft of a bolt fastener. The blade is attached directly to the end portion of the drive shaft and is compressed by the threaded bolt fastener onto the end of the drive shaft.

Replacement blades are available in a variety of configurations. One such blade in widespread use has a central opening for receiving a bolt for direct attachment to the threaded bore of an engine drive shaft. Holes for receiving locking pins are formed on opposite sides of the central opening. Other replacement blades are provided with only a single central opening for attachment of the blade directly onto the drive shaft, and no openings are provided for receiving locking pins.

OBJECTS OF THE INVENTION

The principal object of the present invention is to provide an improved blade hub which provides positive coupling of a cutting blade to an internally threaded drive shaft in a first configuration employing locking pins, and which is convertible to a second configuration in which locking pins are not employed.

A general object of the present invention is to provide an improved blade hub coupling assembly for attaching various types of replacement cutting blades to an engine drive shaft of the type having an axially-extending, internally threaded bore.

A related object of the invention is to provide an improved hub coupling assembly for attaching a cutting blade to the drive shaft of a lawn mower engine, which is simple to remove and install for accommodating blade removal and installation when it is necessary to sharpen the blade or replace it.

Another object of the present invention is to provide an improved blade hub coupling assembly for attaching a cutting blade to the drive shaft of a replacement engine which is mounted onto a carriage frame from which an original equipment engine has been removed, with the cutting height of the cutting blade as mounted onto the replacement engine being essentially the same as the cutting height provided by the original equipment engine and cutting blade combination.

Another object of the invention is to provide a blade coupling assembly in which the axial clearance of the coupling assembly relative to the underside of an original equipment mounting frame can be adjusted and accurately set to accommodate a replacement engine having different drive shaft dimensions.

SUMMARY OF THE INVENTION

A convertible blade hub assembly attaches a cutting blade to the crank shaft of an internal combustion engine on a lawn mower. The coupling assembly includes a spindle having a base plate and a collar which fits about the drive shaft of the lawn mower. A pair of locking pins are removably received within mounting sockets formed on opposite sides of a central bolt opening in the base plate. Reduced diameter portions project outwardly therefrom. A lawn mower blade is provided with three corresponding openings which are aligned with the central bolt opening and the locking pins, respectively. The reduced diameter locking pin portions project through the corresponding openings of the blade, with the central opening of the blade being aligned with the central bolt opening of the base plate.

The locking pins are confined within the base plate sockets by the underside surface of the blade. In this configuration, the locking pins provide positive engagement of the blade onto the hub, thereby preventing slipping rotation of the blade relative to the hub.

The hub is converted to engage a replacement cutting blade which does not have locking pin openings by removing the locking pins from their sockets. With the locking pins removed, the blade is compressed directly against the hub. In a preferred embodiment, positive coupling is provided by the engagement of blade side flanges on opposite sides of the hub.

The features and advantages of the present invention will be further appreciated by those skilled in the art upon reading the detailed description which follows in conjunction with the attached drawings.

DETAILED DESCRIPTION OF THE PREFERRED EMBODIMENT

Figure 1:
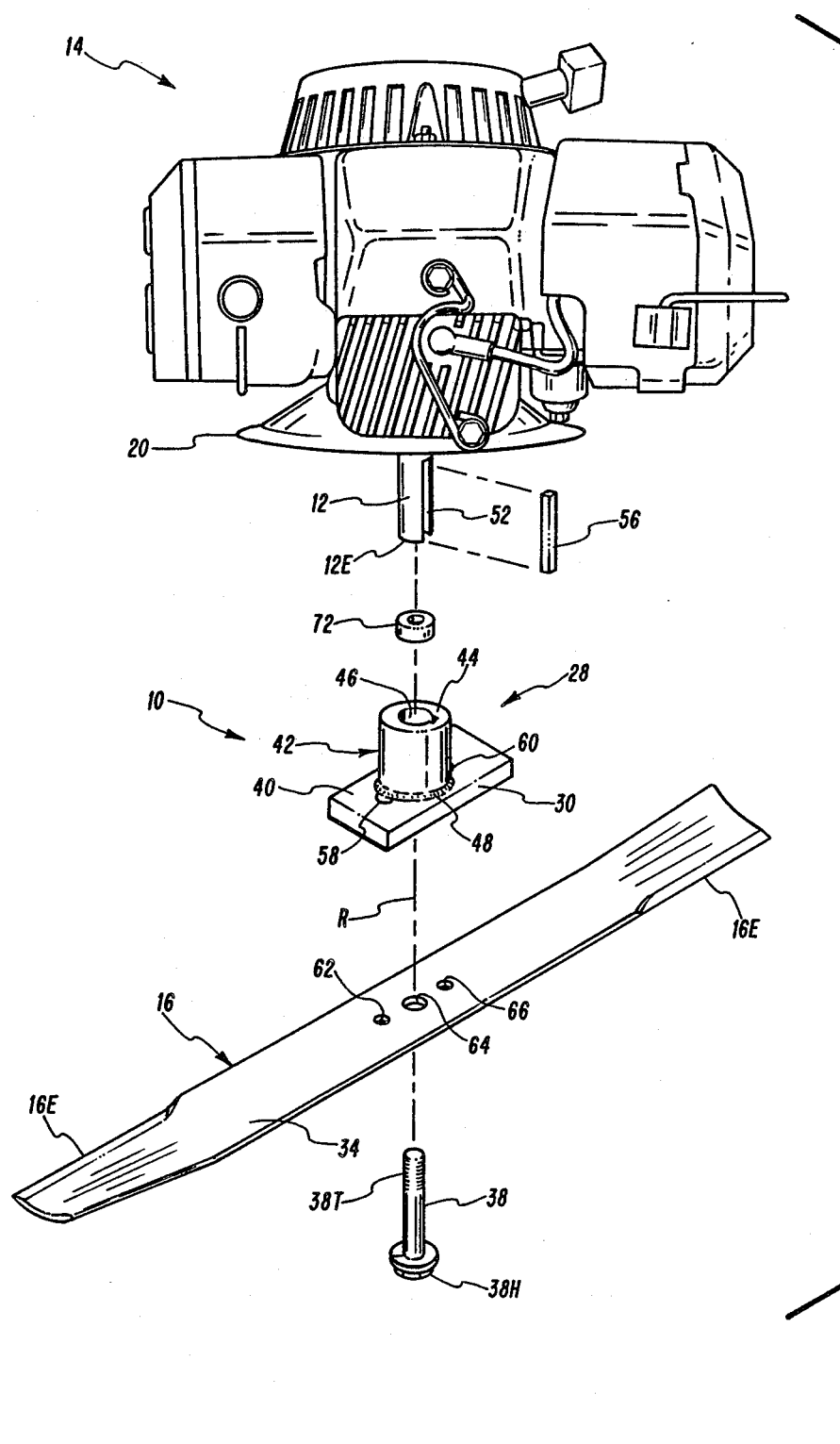
FIG. 1 is an exploded perspective view of my new coupling assembly as used to connect a cutting blade to the drive shaft of an internal combustion engine.

In the description which follows, like parts are indicated throughout the specification and drawings with the same reference numerals, respectively. The drawings are not necessarily to scale and certain parts have been exaggerated to better illustrate details and features of the invention.

Figure 2:
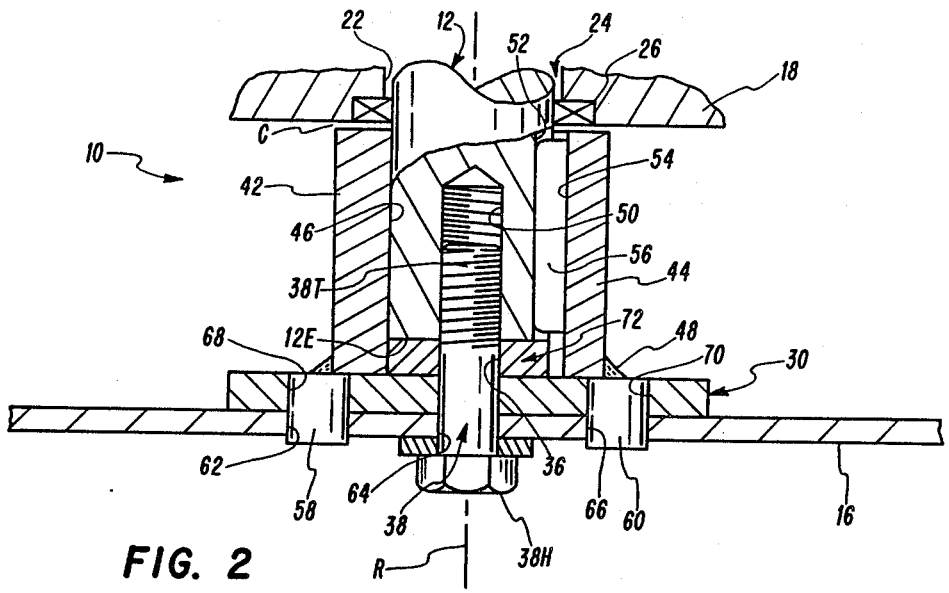
FIG. 2 is a sectional view of the blade, coupling assembly and drive shaft shown assembled together.

Referring now to FIGS. 1 and 2 of the drawings, a blade coupling assembly 10 fits about the drive shaft 12 of an internal combustion engine 14. The coupling assembly 10 receives a cutting blade 16 in interlocking, positive engagement for rotation through a horizontal plane extending generally at a right angle with respect to the rotational axis R.

The internal combustion engine 14 includes an engine block 18 and a flange 20 for mounting the engine onto the carriage housing of a lawn mower. As can best be seen in FIG. 2, the engine block 18 is provided with a bore 22 through which drive shaft 12 projects. The annular interface 24 between the rotary drive shaft 12 and bore 22 is sealed by an annular oil seal 26.

Figure 3:
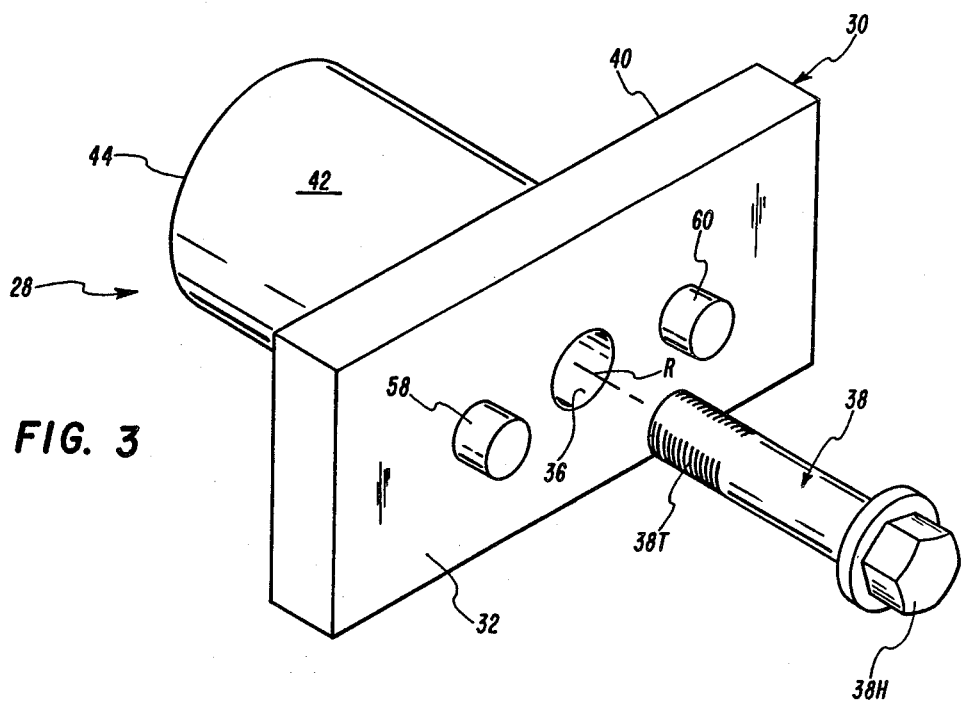
FIG. 3 is a perspective view of a spindle which forms a part of my blade coupling assembly.

Referring now to FIGS. 2 and 3, the principal component of the blade coupling assembly 10 is a spindle 28 which mechanically couples the cutting blade 16 onto the drive shaft 12. Spindle 28 includes a hub in the form of base plate 30 having a rectangular, flat face 32 for engaging a flat side surface 34 of the cutting blade 16. A central opening 36 is formed through the base plate 30 for receiving a threaded bolt fastener 38. The central opening 36 extends completely through the base plate to its opposite side surface 40.

A collar 42 having a cylindrical sidewall 44 with a circular bore 46 coaxially aligned with the base plate opening 36 is attached to side surface 40 of the base plate by a weld bead 48. Preferably, the opposite side surfaces 32, 40 are parallel with each other, and the collar 42 projects in right-angle relation to the flat side surfaces of the base plate 30. The length of the collar 42 is slightly longer than the axial projection of the engine drive shaft 12, with its circular bore 46 being sized appropriately to receive the engine drive shaft 12.

The drive shaft 12 has a threaded, blind bore 50 which extends axially into the shaft. The bolt fastener 38 is provided with matching threads 38T which are received in threaded engagement with the threaded bore 50. The drive shaft 12 also is provided with a keyway 52 which is machined into the sidewall of the drive shaft and which extends in parallel with the drive shaft axis R.

Figure 4:
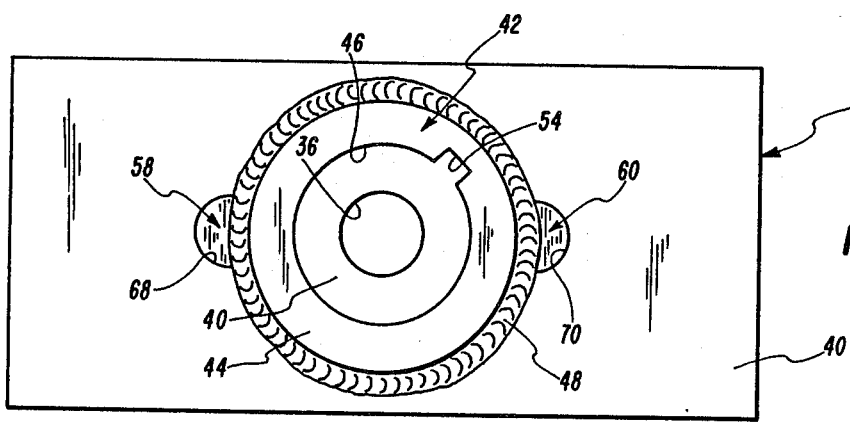
FIG. 4 is a top plan view of the spindle.

As shown in FIG. 4, a corresponding keyway 54 is machined into the cylindrical sidewall 44 of collar 42. A shear spline 56 is received in both keyways 52, 54 and positively couples the spindle 28 onto the drive shaft 12. The shear spline 56 is designed to transmit torque from the drive shaft to the spindle until a force or impact is transmitted to the cutting blade 16 which exceeds the shear strength of the spline 56.

The flat side surface 34 of cutting blade 16 is drawn into compressive engagement with flat side surface 32 of base plate 30 by the threaded bolt fastener 38. The position of cutting blade 16 relative to the base plate 30 is established by a pair of cylindrical locking pins 58, 60 which project outwardly from the base plate side surface 32. The locking pins 58, 60 are positioned in center-to-center alignment with base plate bore 36.

Referring to FIGS. 2, 3 and 4, the locking pins 58, 60 are received within cutting blade openings 62, 66 which are aligned in center-to-center relation with a central blade opening 64. The pins 58, 60 and the base plate opening 36 are equally spaced and aligned for registration with the three holes 62, 64 and 66 which are formed in the cutting blade 16. The locking pins 58, 60 are received in the corresponding blade openings 62, 66 respectively, with the central blade opening 64 being aligned with the central bolt opening 36 of the base plate 30.

Referring now to FIGS. 2 and 4, the pins 58, 60 are received within cylindrical pockets 68, 70 which are equally spaced in center-to-center alignment with base plate opening 36. The upper end surfaces of pins 58, 60 are flush with the base plate side surface 40. Preferably, the cylindrical sidewall 44 of the collar 42 overlaps a portion of each pin. According to this arrangement, the weld bead 48 rigidly secures the collar 42 onto the base plate 30, and rigidly anchors the locking pins 58, 60 within the pockets 68, 70 respectively.

According to an important feature of the invention, a spacer ring 72 is interposed between the drive shaft end 12E and the top side surface 40 of the base plate 30. The blade 16 is secured between the bolt head 38H and the lower side surface 32 of the base plate 30, with the spacer ring 42 being compressed between the base plate and the end of the drive shaft. The spacer ring 72 serves as a shim for precisely setting the vertical spacing distance between the blade and the engine. Additionally, the spacer ring serves as a compression friction element which cooperates with the shear spline 56 for locking the coupling assembly 10 onto the drive shaft 12. The axial dimension of spacer ring 72 is selected to provide for a clearance C between the collar 42 and the underside of the engine block 18 as can be seen in FIG. 2. The axial clearance C is preferably small, approximately 0.0025 inch, to prevent the accumulation of debris around the drive shaft 12.

According to the foregoing arrangement, the locking pins 58, 60 fix the position of the cutting blade 16 relative to the base plate, and prevent rotation of the cutting blade relative to the base plate. Torque is transmitted from the drive shaft 12 to the cutting blade 16 through the spindle 28 and shear spline 56, spacer ring 72, the base plate 30 and locking pins 58, 60.

The spindle and spacer ring are preferably constructed of heat-treated, weldable stock, for example ASA 1018 steel.

It will be appreciated that the cutting blade 16 can be easily assembled onto and removed from the spindle 28, merely by removing the bolt fastener 38. Because of the symmetrical location of the locking pins, collar and blade, the overall blade and spindle assembly remains balanced, except for variations caused by normal wear of the blade cutting edges. The axial clearance C between the collar 42 and the engine block 18 is accurately set for a given drive shaft and collar combination by the selection of an appropriately sized spacer ring 72.

Referring now to FIGS. 5, 6, 7 and 8, a blade coupling assembly 10 provides positive coupling of a cutting blade to the drive shaft 12 in a first configuration (FIGS. 5 and 6) employing locking pins, and which is convertible to a second configuration (FIGS. 7 and 8) in which locking pins are not employed. In this arrangement, the locking pins 58, 60 are removably received within the pockets 68, 70, respectively. Locking pin 58 is provided with a cylindrical body portion 58A which is dimensioned appropriately for easy insertion into and removal from the pocket 68. The large diameter cylindrical portion 58A is inserted into the pocket 68 after the hub 30 has been welded to the cylindrical sidewall 44 of the collar 42 by the weld bead 48. The reduced diameter cylindrical pin portion 58B projects outwardly from the planar face 32 of the base plate 30 and is received in registration with the hole 62A formed within the blade 16. Likewise, the locking pin 60 is provided with a large diameter cylindrical portion 60A and reduced diameter pin portion 60B for insertion into the base plate pocket 70 and blade opening 66A, respectively. This stepped diameter arrangement for the locking pins 58, 60 provides the locking pins with annular shoulders 58C, 60C, respectively.

According to the foregoing arrangement, the removable locking pins 58, 60 are confined within the pockets 68, 70, respectively. As can best be seen in FIG. 6, each pin is confined between the weld bead 48 and the planar surface 34 of the cutting blade 16. That is, during operation, the locking pins are confined within the pockets by engagement of the cutting blade against the annular shoulders 58C, 60C and by engagement of the large diameter cylindrical portions 58, 60A against the weld bead 48. Alternatively, the pockets 68, 70 are blind bores, and the large diameter head portions are confined by engagement against the surrounding base plate 30.

Figure 7:
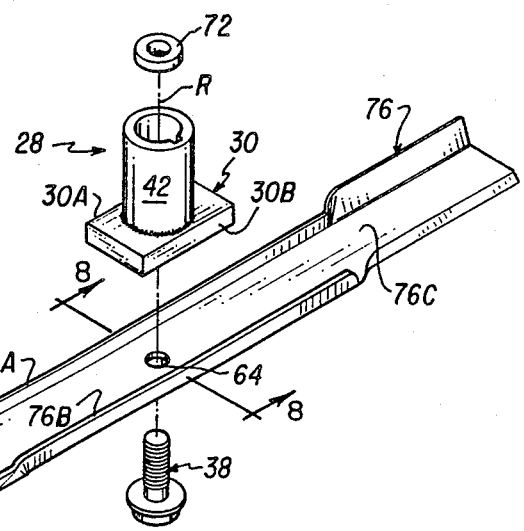
FIG. 7 is an exploded perspective view of a coupling hub and blade assembly in which locking pins are not employed; and, FIG. 8 is a sectional view which illustrates positive coupling engagement of the blade and hub as shown in FIG. 7.

It may be desirable to replace a flat blade 16 of the type having openings for receiving locking pins with a cutting blade of the type having only a single central opening, for example a flanged blade 76 as illustrated in FIG. 7. The flanged blade 76 is provided with a single central opening 64 through which the fastening bolt 38 is inserted. Positive locking action is provided in this arrangement by first and second upturned flanges 76A, 76B. As can best be seen in FIG. 8, the base plate 30 is received within the channel formed by the upturned flanges with its planar face 32 in direct engagement with the top planar surface 76C of cutting blade 76. The side edges 30A, 30B of base plate 30 are confined between the upturned flanges 76A, 76B, respectively. According to this arrangement, the cutting blade 76 is positively locked in position onto the base plate 30, thereby preventing rotation of the blade 76 relative to the spindle 28.

Figure 5:
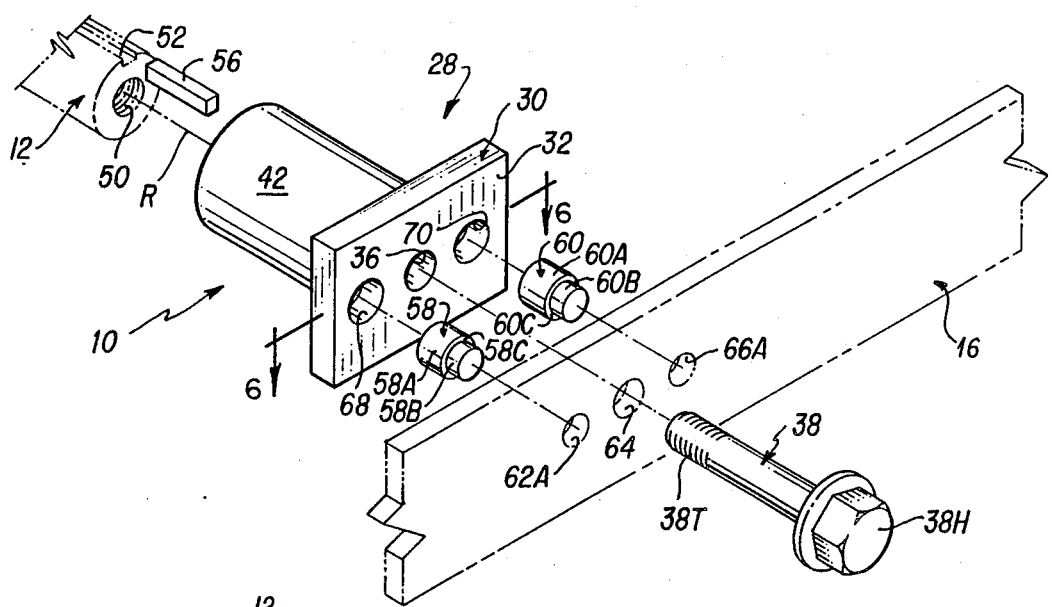
FIG. 5 is an exploded perspective view which illustrates removal of locking pins.
Figure 6:
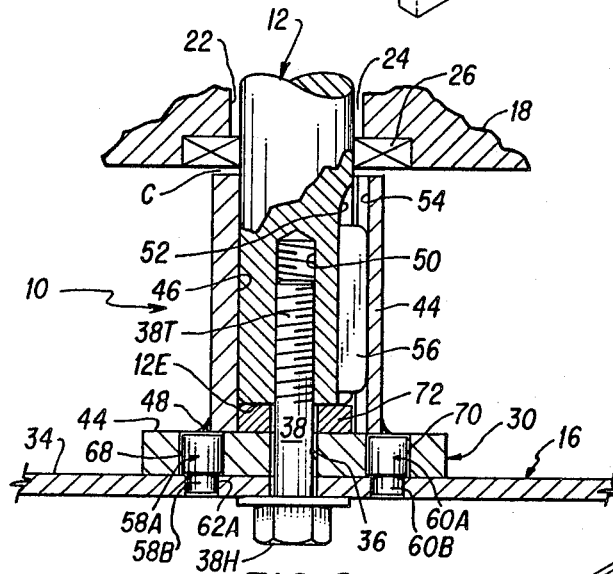
FIG. 6 is a sectional view similar to FIG. 2 which illustrates confinement of the removable locking pins.
Figure 8:
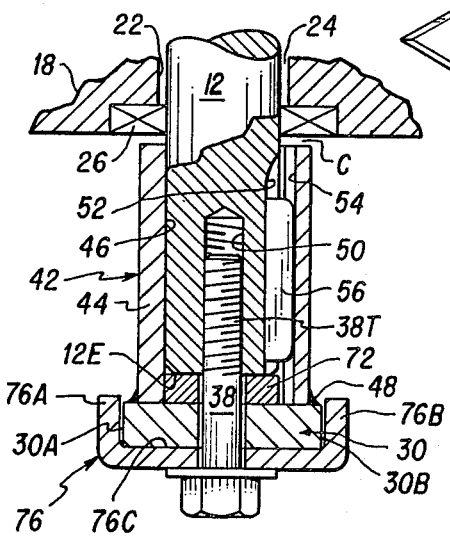

To convert the spindle assembly 28 from the locking pin arrangement shown in FIG. 5 to the flange lock assembly shown in FIG. 8, it is necessary to remove the fastener bolt 38 so that the blade 16 can be removed from the lock plate 30. With the blade 16 removed, the locking pins 58, 60 are removed from the sockets 68, 70 and separated from the base plate 30. With the locking pins 58, 60 removed, the flange blade 76 is then positioned with the flanges 76A, 76B aligned in parallel with the base plate side surfaces 30A, 30B, and the blade 76 is fitted about the base plate 30 with the bolt opening 64 in registration with the threaded bore 50 of the crank shaft 12. The axial clearance C between the collar 42 and the engine block 18 is set by insertion of an appropriately sized spacer ring 72. Thereafter, the fastener bolt 38 is tightened, and the flange blade 76 is positioned and secured as shown in FIG. 8.

Although the invention has been described with reference to a specific embodiment, and with reference to specific lawn mower replacement blade applications, the foregoing description is not intended to be construed in a limiting sense. Various modifications of the disclosed embodiment as well as alternative applications of the invention will be suggested to persons skilled in the art in view of the foregoing specification and illustrations. For example, the blade coupling assembly can be used to good advantage in combination with an electric motor as well as the internal combustion engine as illustrated. Moreover, although a lawn mower cutting blade is the subject of the illustration, the coupling assembly 10 can be used effectively for coupling other mechanical load devices, for example the input plate of a gear reduction drive on a power tool, or as a direct coupling assembly for the impeller of a pump, or for a power auger. It is therefore contemplated that the appended claims will cover any such modifications or embodiments that fall within the true scope of the invention.

What is claimed is:

1. A convertible blade hub assembly for attaching either flanged cutting blades having upturned side flanges or unflanged cutting blades having a locking pin opening to an engine drive shaft of the type having a threaded bore for receiving a threaded bolt fastener, said blade hub assembly comprising, in combination:

a base plate having first and second side surfaces, a bore extending through said base plate intermediate said side surfaces, and a pocket formed within said base plate intermediate said side surfaces;

a locking pin for insertion into said pocket, said locking pin having a reduced diameter end portion and having an annular shoulder;

a tubular collar mounted onto said base plate and projecting substantially at a right angle with respect thereto, said tubular collar having a cylindrical bore for receiving said drive shaft;

whereby said blade hub is adapted for coupling engagement with an unflanged cutting blade by insertion of the locking pin into said base plate pocket, with the reduced diameter end portion of said locking pin projecting through the locking pin opening formed in said unflanged cutting blade, and with the annular shoulder portion of said locking pin being engaged and confined within the pocket by the unflanged cutting blade, said cutting blade being compressed between the bolt fastener and the base plate as the bolt fastener is advance in threaded engagement within the threaded bore of the engine drive shaft; and, whereby said blade hub is adapted for coupling engagement with a flanged cutting blade upon removal of said locking pin from said pocket, with the upturned side flanges of the flanged cutting blade engaging the first and second side surfaces of the base plate, and with the flanged cutting blade being compressed between the bolt fastener and base plate as the bolt fastener is advanced in threaded engagement within the threaded bore of the engine drive shaft

* * * * *

UNITED STATES PATENT AND TRADEMARK OFFICE
CERTIFICATE OF CORRECTION

PATENT NO. : 4,771,593
DATED : September 20, 1988
INVENTOR(S) : Harold D. Lee

It is certified that error appears in the above-identified patent and that said Letters Patent is hereby corrected as shown below:

Column 7, line 8, "advance" should be -- advanced --.

Signed and Sealed this

Thirty-first Day of January, 1989

*Attest:*

DONALD J. QUIGG

*Attesting Officer*   *Commissioner of Patents and Trademarks*